(12) United States Patent
DeLuca

(10) Patent No.: US 12,464,072 B2
(45) Date of Patent: Nov. 4, 2025

(54) SECURELY CONTROLLING COMMUNICATION SESSIONS USING USER DOMAIN

(71) Applicant: Unstoppable Domains, Inc., Las Vegas, NV (US)

(72) Inventor: Lisa Seacat DeLuca, Bozeman, MT (US)

(73) Assignee: Unstoppable Domains, Inc., Las Vegas, NV (US)

( * ) Notice: Subject to any disclaimer, the term of this patent is extended or adjusted under 35 U.S.C. 154(b) by 294 days.

(21) Appl. No.: 17/886,577

(22) Filed: Aug. 12, 2022

(65) Prior Publication Data

US 2024/0056525 A1 Feb. 15, 2024

(51) Int. Cl.
*H04M 3/38* (2006.01)
*H04W 4/16* (2009.01)
*H04W 8/26* (2009.01)

(52) U.S. Cl.
CPC .............. *H04M 3/38* (2013.01); *H04W 4/16* (2013.01); *H04W 8/26* (2013.01)

(58) Field of Classification Search
CPC ............ H04W 4/16; H04W 8/26; H04M 3/38
USPC ....................................................... 455/415
See application file for complete search history.

(56) References Cited

U.S. PATENT DOCUMENTS

| | | | |
|---|---|---|---|
| 8,228,900 B2 * | 7/2012 | Lindgren | ............ H04L 65/1069 370/352 |
| 9,553,981 B2 | 1/2017 | Czarnecki et al. | |
| 10,846,762 B1 | 11/2020 | Dennis et al. | |
| 11,558,344 B1 | 1/2023 | Pezeshki et al. | |
| 11,750,570 B1 | 9/2023 | Eby et al. | |
| 12,309,111 B2 | 5/2025 | DeLuca et al. | |

(Continued)

FOREIGN PATENT DOCUMENTS

| | | |
|---|---|---|
| CN | 1984185 A | 6/2007 |
| KR | 20220066823 A | 5/2022 |
| WO | 2020/010023 A1 | 1/2020 |

OTHER PUBLICATIONS

Mwrwan Abubakar et al. (Blockchain-Based Authentication and Registration Mechanism for SIP-Based VoIP Systems; IEEE; 2021) (Year: 2021).*

(Continued)

*Primary Examiner* — Hirdepal Singh
(74) *Attorney, Agent, or Firm* — Edell, Shapiro & Finnan, LLC

(57) ABSTRACT

According to a present invention embodiment, a system for conducting communication sessions comprises one or more memories and at least one processor coupled to the one or more memories. The system receives a domain name that is provided by a first user to establish a communication session with a second user, wherein the domain name is associated with the second user. The system determines contact information of the second user for the communication session based on the domain name. The system provides the contact information of the second user to establish the communication session between communication devices of the first and second users. Embodiments of the present invention further include a method and computer program product for conducting communication sessions in substantially the same manner described above.

18 Claims, 8 Drawing Sheets

(56) References Cited

U.S. PATENT DOCUMENTS

| | | | | |
|---|---|---|---|---|
| 2011/0124354 | A1* | 5/2011 | Nagata | H04M 1/2746 455/466 |
| 2014/0223283 | A1* | 8/2014 | Hancock | G06F 40/14 726/4 |
| 2015/0356523 | A1 | 12/2015 | Madden | |
| 2016/0217436 | A1 | 7/2016 | Brama | |
| 2016/0330027 | A1 | 11/2016 | Ebrahimi | |
| 2016/0353266 | A1* | 12/2016 | Winkler | H04W 12/08 |
| 2017/0331810 | A1 | 11/2017 | Kurian | |
| 2018/0204213 | A1 | 7/2018 | Zappier et al. | |
| 2019/0096021 | A1 | 3/2019 | Jarvis et al. | |
| 2019/0166085 | A1* | 5/2019 | Li | H04L 9/3239 |
| 2019/0364016 | A1* | 11/2019 | Kamdar | G06Q 30/02 |
| 2020/0406859 | A1 | 12/2020 | Hassani | |
| 2020/0409942 | A1 | 12/2020 | Kasimov et al. | |
| 2021/0058353 | A1 | 2/2021 | Creech et al. | |
| 2022/0198049 | A1 | 6/2022 | Dumas et al. | |
| 2022/0198444 | A1* | 6/2022 | Mee | G06Q 20/389 |
| 2022/0210061 | A1 | 6/2022 | Simu et al. | |
| 2023/0065364 | A1* | 3/2023 | Aichinger | H04L 67/141 |
| 2023/0171225 | A1 | 6/2023 | Pezeshki et al. | |
| 2023/0206218 | A1 | 6/2023 | Defour | |
| 2023/0281604 | A1* | 9/2023 | Robell | G06Q 30/018 |
| 2023/0418979 | A1 | 12/2023 | DeLuca et al. | |
| 2023/0421399 | A1 | 12/2023 | Quirk et al. | |
| 2024/0146523 | A1 | 5/2024 | DeLuca et al. | |
| 2024/0236076 | A1* | 7/2024 | Paul | H04L 9/3271 |
| 2024/0250931 | A1 | 7/2024 | Seifert et al. | |
| 2024/0314095 | A1 | 9/2024 | DeLuca et al. | |

OTHER PUBLICATIONS

"Allowlists, denylists, and approved senders", Google Workspace Admin Help, https://support.google.com/a/answer/60752?hl=en#:~:text=Email allowlist—A list of, allowlist the contact's IP address 1, downloaded from the Internet on Oct. 31, 2022, 1 page.

"S/MIME Digital Signatures", GlobalCerts, https://globalcerts.com/smime-digital-signatures, downloaded from the internet on Oct. 31, 2022, 5 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Humanity Check Overview", https://docs.unstoppabledomains.com/login-with-unstoppable/humanity-check/humanity-check-for-login/, downloaded from the internet on Apr. 7, 2022, 5 pages.

"Progressive risk segmentation: your secret to balancing fraud prevention and conversion", https://withpersona.com, downloaded from the internet on Apr. 1, 2022, 7 pages.

Jennifer Lowe, "What is KYC and why does it matter?", Plaid.com, Aug. 12, 2021, 15 pages.

Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.

International Search Report and Written Opinion in International Application No. PCT/US23/68858, dated Oct. 19, 2023, 8 pages.

"Introducing Blend: the Peer-to-Peer Perpetual Lending Protocol for NFT's", https://x.com/blur_io/status/1653051809240604674?s=20, downloaded from the internet Jun. 26, 2024, 2 pages.

Owen Fernau, "Blur Launches NFT Lending Protocol", The Defiant, https://thedefiant.io/news/nfts-and-web3/blur-nft-lending, May 2, 2023, 7 pages.

International Search Report and Written Opinion in International Application No. PCT/US23/71399, dated Nov. 16, 2023, 10 pages.

"DNS records for unstoppabledomains.com", Unstoppable Domains, https://www.nslookup.io/domains/unstoppabledomains.com/dns-records/, downloaded from the internet on Nov. 16, 2023, 5 pages.

"Why Are Some Domains Protected?", Unstoppable Domains, Mar. 11, 2022, https://support.unstoppabledomains.com/support/solutions/articles/48001186091-why-are-some-domains-protected, 3 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

"What is a non-fungible token (NFT)?", https://www.coinbase.com/learn/crypto-basics/plp-what-is-nft, downloaded from the internet on Mar. 25, 2022, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

James Beck, Blog, "Mirror.xyz Review: How to Use MetaMask to Compete in the $Write Race", Jul. 30, 2021, https://consensys.net/blog/metamask/mirror-xyz-review-how-to-use-metamask-to-compete-in-the-write-race, 14 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

"Unstoppable Domains launches Login with Unstoppable", https://unstoppabledomains.com/blog/introducing-login-with-unstoppable, Jan. 9, 2022, 7 pages.

Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.

"Claim your DNS name onchain in ENS", ENS, https://support.ens.domains/en/articles/7882690-claim-your-dns-name, downloaded from the internet on Feb. 9, 2024, 10 pages.

"Ethereum Name Service (ENS)", https://etherscan.io/token/0xc18360217d8f7ab5e7c516566761ea12ce7f9d72#readContract, downloaded from the internet on Feb. 9, 2024, 4 pages.

"Ethereum Name Service (ENS)", https://etherscan.io/token/0xc18360217d8f7ab5e7c516566761ea12ce7f9d72#writeContract, downloaded from the internet on Feb. 9, 2024, 2 pages.

"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.

"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.

International Preliminary Report on Patentability in PCT/US2023/071399, issued Feb. 4, 2025, 5 pages.

\* cited by examiner

SECURELY CONTROLLING COMMUNICATION SESSIONS USING USER DOMAIN

BACKGROUND

1. Technical Field

Present invention embodiments relate to telecommunication technology, and more specifically, to securely controlling communication sessions using user Non-Fungible Token (NFT) domain names.

2. Discussion of the Related Art

With the advent of modern smartphones, users now primarily store contact details digitally rather than memorize the contact details of family, friends and colleagues. However, at times the stored contact data can be unavailable, such as when a smart phone battery depletes, a device is lost, and the like. This can be problematic, as a child may not recall a caretaker's telephone number, or an individual may not be able to recall how to reach a contact during an emergency, for example.

SUMMARY

According to one embodiment of the present invention, a system for conducting communication sessions comprises one or more memories and at least one processor coupled to the one or more memories. The system receives a domain name that is provided by a first user to establish a communication session with a second user, wherein the domain name is associated with the second user. The system determines contact information of the second user for the communication session based on the domain name. The system provides the contact information of the second user to establish the communication session between communication devices of the first and second users. Embodiments of the present invention further include a method and computer program product (e.g., including one or more computer readable media with executable instructions) for securing user data in substantially the same manner described above.

BRIEF DESCRIPTION OF THE DRAWINGS

Generally, like reference numerals in the various figures are utilized to designate like components.

DETAILED DESCRIPTION

Figure 1:
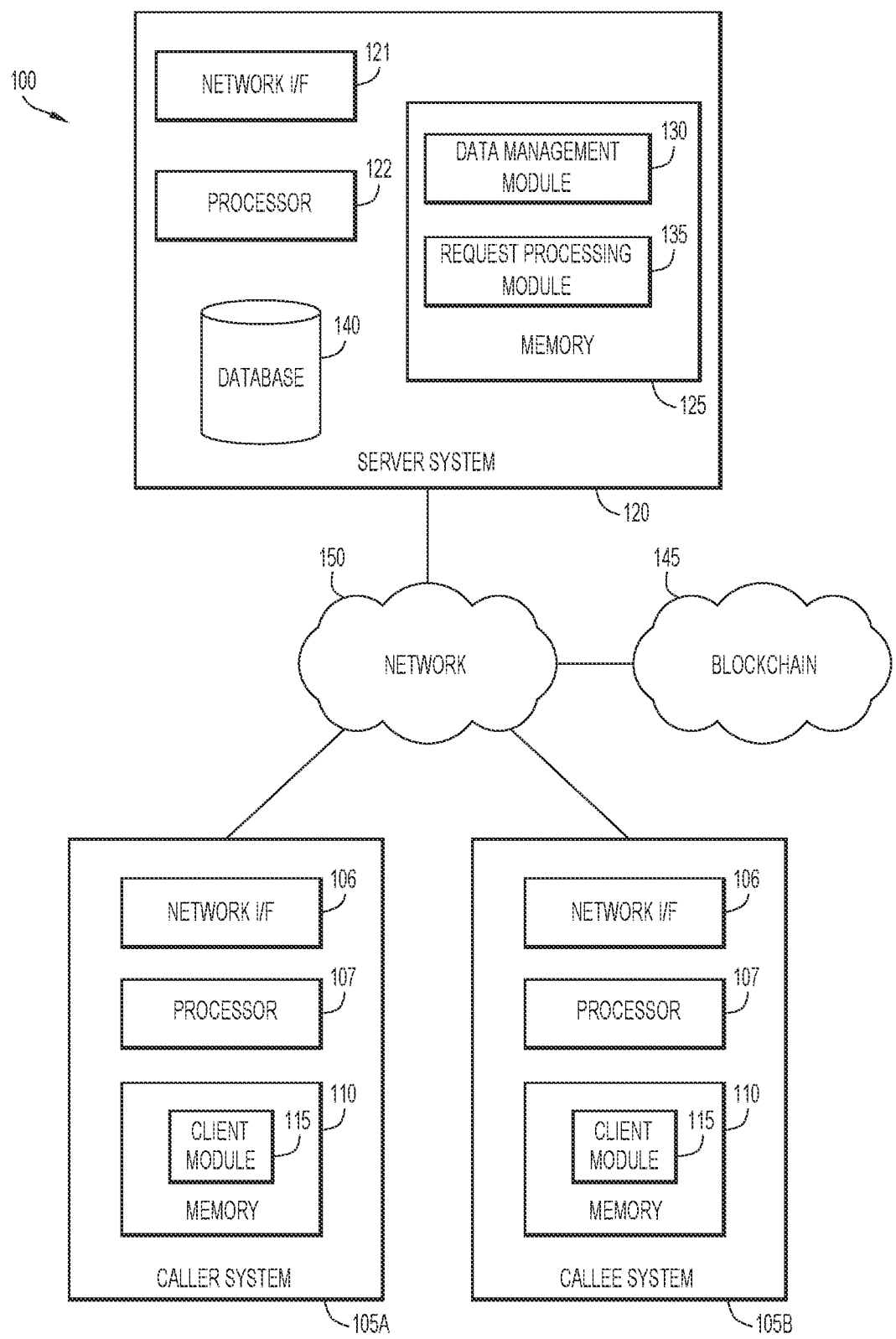
FIG. 1 is a diagrammatic illustration of an example computing environment according to an embodiment of the present invention.

An embodiment of the present invention employs a domain name that is provided in place of contact data (e.g., a telephone number) to a field in order to initiate a communication session. The domain name may be securely linked to the contact data so that a service may request the contact data using the domain name and, if authorized, the contact data may then be provided to the service. In various embodiments, the contact data can be stored on a blockchain, a decentralized storage platform, or in a database, and the domain name may include a non-fungible token (NFT) domain name that is associated with an NFT stored in a cryptocurrency wallet of a user. A user's contact data (e.g., telephone number) can accordingly be accessed using the user's domain name.

As used herein, a "caller" may refer to an individual who desires to initiate a communication session, and a "callee" may refer to the individual with whom the caller is attempting to communicate. By using an easily-memorable domain name that is associated with the callee, the caller can initiate a communication session without having to remember the callee's actual contact data. For example, if a user is in a situation in which the user's smartphone is damaged or the battery is dead, the user can borrow a phone of a bystander to call a friend using the friend's domain name; thus, the user does not have to remember the friend's telephone number.

Accordingly, present invention embodiments enable a caller to provide a personal domain name in lieu of a callee's contact data whenever the caller desires to initiate a communication session. Moreover, users may retain control over his or her contact data by requiring manual approval before a system provides contact data to a requesting caller. Additionally, callers can provide metadata, such as the caller's identity or a customized message, in a request, enabling a callee to more finely control whom the callee wishes to grant access to the callee's contact data.

Thus, present invention embodiments improve the technical fields of information science and cybersecurity by providing an improved approach to controlling access to user contact data, particularly when the data is provided for the purpose of being utilized to more easily facilitate communication sessions. Present invention embodiments utilize a unique approach to sharing contact data online in that a placeholder callee-specific domain name is used instead of the underlying telephone number or other contact data, thereby providing a safety mechanism that enables a callee to maintain downstream control of his or her personal data. Moreover, usage of a domain name enables a callee to update their contact data once so that the most up-to-date contact data is automatically used whenever a caller uses the callee's domain name. Present invention embodiments also improve the functioning of a computer by centralizing the process of securely accessing a user's contact data, thus removing the need for each individual third-party service to dedicate the processing resources, memory resources, and/or storage resources normally required to maintain such data. Additionally, storing contact data to a blockchain ensures that contact data is immutably stored, thereby providing both security and data resilience. Contact data can be confidentially stored in an encrypted form by encrypting the data and storing the encrypted data on a database, blockchain, or a decentralized storage platform.

Present invention embodiments will now be described in detail with reference to the Figures. FIG. 1 is a diagrammatic illustration of an example computing environment 100 in accordance with an embodiment of the present invention. As depicted, computing environment 100 includes a caller system 105A, a callee system 105B, a server system 120, a blockchain 145, and a network 150. It is to be understood that the functional division among components of computing environment 100 have been chosen for purposes of explaining present invention embodiments and is not to be construed as a limiting example.

Caller system 105A and callee system 105B each includes a network interface (I/F) 106, at least one processor 107, and memory 110. Memory 110 includes a client module 115. Caller system 105A and callee system 105B may each include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of Caller system 105A and callee system 105B to send and receive data over a network, such as network 150. In general, caller system 105A and callee system 105B enable users to perform various operations in accordance with present embodiments, including, but not limited to, adding or modifying user contact data, managing contact data access permissions, managing cryptocurrency wallets, authorizing requests to engage in communication sessions, and other operations. Caller system 105A and callee system 105B may each include internal and external hardware components, as depicted and described in further detail with respect to FIG. 2.

Client module 115 may include one or more modules or units to perform various functions of present invention embodiments described below. Client module 115 may be implemented by any combination of any quantity of software and/or hardware modules or units, and may reside within memory 110 of caller system 105A and/or callee system 105B for execution by a processor, such as processor 107.

Client module 115 enables a user of either caller system 105A or callee system 105B to perform various operations in accordance with present invention embodiments, including, but not limited to, engaging in communication sessions, adding or modifying contact data, approving communication sessions, and the like. In some embodiments, client module 115 supports a communication session by integrating with components of caller system 105A and callee system 105B (e.g., a camera, speaker, and/or microphone, etc.) in order to capture video and/or audio data that can be exchanged between caller system 105A and callee system 105B.

Client module 115 may enable a user to initiate a communication session by providing a callee's domain name as input rather than the callee's contact data (e.g., telephone number, Voice over Internet Protocol (VoIP) contact details, etc.). In some embodiments, client module 115 recognizes that a domain name is provided based on features of the domain name, such as the presence of a period followed by a particular top-level domain (TLD) or other domain name (e.g., ".crypto"). Client module 115 may pass the domain name to a server (e.g., server system 120) in order to initiate a communication session with the callee that is associated with the domain name. In some embodiments, the server (e.g., server system 120) provides client module 115 with the contact data that is required to initiate the communication session, and the communication session may be conducted via a conventional telephony or VoIP system. In other embodiments, the server (e.g., server system 120) may host the communication session by facilitating, as an intermediary, the exchange of data between caller system 105A and callee system 105B.

In some embodiments, client module 115 enables a callee to indicate whether the callee consents to establishing a communication session. Client module 115 may include a user interface that enables the callee to provide input to callee system 105B to accept or deny a call. In some embodiments, client module 115 manages a cryptocurrency wallet of a user, in which one or more NFTs are stored. An NFT can be associated with the user's domain name, and the user can manage the wallet in order to provide consent to a communication session. In particular, callee system 105B may be identified, using a domain name that is associated with an NFT based on the presence of the NFT in the callee's wallet. When a callee approves a caller for a communication session, the approval can be persisted locally (e.g., at callee system 105B), in a database (e.g., database 140) and/or on a blockchain (e.g., blockchain 145) so that the caller will automatically be approved for future communication sessions. A caller can provide metadata, such as an identity of the caller, which can be stored along with the callee's approval, so that when the caller initiates the communication session from any device, the caller will be automatically approved.

In some embodiments, client module 115 enables a user to access a user profile that stores the user's contact data, including telephone number, email address, and/or any other identifier that can be used to establish a communication session. Additionally, the user profile may store an association between the user's domain name and the user's contact data. Accordingly, a user can access the user's profile via client module 115 to update contact data, provide alternative contact data (e.g., a home telephone number, cell telephone number, VoTP telephone number, etc.), and the like.

Server system 120 includes a network interface (I/F) 121, at least one processor 122, memory 125, and a database 140. Memory 125 includes a data management module 130, and a request processing module 135. Server system 120 may include a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 121 enables components of server system 120 to send and receive data over a network, such as network 150. Server system 120 may include internal and external hardware components, as depicted and described in further detail with respect to FIG. 2.

In general, server system 120 and its components supports the initiation and/or conducting of communication sessions in accordance with present invention embodiments. Additionally or alternatively, server system 120 may enable users to access, manage, and store contact data. In some embodiments, server system 120 processes requests to initiate communication sessions from caller devices (e.g., caller system 105A, etc.). The software components of server system 120, which include data management module 130 and request processing module 135, may themselves include one or more modules or units to perform various functions of present invention embodiments described below. Data management module 130 and request processing module 135 may be implemented by any combination of any quantity of software and/or hardware modules or units, and may reside within memory 125 of server system 120 for execution by a processor, such as processor 122.

Data management module 130 enables a user to provide user contact data, access user contact data, modify user contact data, authorize callers for communication sessions, and/or perform other operations in accordance with present invention embodiments. Generally, data management module 130 processes instructions for managing user contact data by accessing the storage location of the user data. Data management module 130 may receive instructions from a client, such as client module 115, to add, modify, or remove user contact data. Additionally, data management module 130 may be provided with instructions indicating that a callee consents to a caller's request to initiate a communication session, which can be stored locally to server system 120 and/or elsewhere along with the user contact data (e.g., as metadata).

Contact data may be securely stored (e.g., using data encryption) in one or more locations, which can include one or more conventional databases (e.g., database 140), a decentralized storage platform, and/or a blockchain (e.g., blockchain 145). Data management module 130 may encrypt contact data for storage using various techniques (e.g., encryption/compression techniques, cryptographic (or public/private) keys, etc.). In embodiments in which user data is stored in an encrypted form (e.g., on a database, decentralized storage platform, or blockchain), data management module 130 may decrypt the user contact data for retrieval.

In some embodiments, the user's contact data is stored in a database (e.g., an off-chain database). The user's contact data may be encrypted by data management module 130 using various techniques (e.g., encryption/compression techniques, cryptographic (or public/private) keys, etc.), and then provided to the database. Data management module 130 may further respond to requests for contact data (e.g., requests being handled by request processing module 135) by accessing the encrypted user contact data and decrypting the user contact data.

In some embodiments, the user's contact data is stored to a decentralized storage platform. The user data may be accessed from nodes of the platform based on content (e.g., a hash of the content serving as a file address, etc.). The user contact data that is stored to a decentralized storage platform may be encrypted by data management module 130 using various techniques (e.g., encryption/compression techniques, cryptographic (or public/private) keys, etc.). Data management module 130 may further facilitate accessing of data by decrypting the encrypted data for retrieval.

In some embodiments, the user's contact data is stored to a blockchain. User contact data that is stored to a blockchain may be encrypted by data management module 130 using various techniques (e.g., encryption/compression techniques, cryptographic (or public/private) keys, etc.). The contact data may be written by smart contracts to the blockchain, and data management module 130 may decrypt the encrypted data for retrieval. The encryption may utilize the keys of the blockchain of the user, where the user private key is used for encryption and the user public key is used for decryption. Since only the user public key can decrypt the encrypted user data, access to the user contact data can be controlled. Alternatively, the encryption and decryption may use public/private keys that are separate from the keys used for the blockchain.

It should be appreciated that the user contact data can be stored using any combination of storage mechanisms (e.g., off-chain database, decentralized storage platform, blockchain, etc.). Some portions of user contact data may be stored using one storage mechanism, and other portions of user data may be stored using another storage mechanism. The user contact data can be stored in any format, and some or all of the user contact data may be encrypted using a private key of a blockchain that is secured (and decrypted using a corresponding public key that is managed), using a separate private/public key encryption scheme, using a symmetric encryption scheme, and/or by any other mechanism for selectively granting access to contact data.

Request processing module 135 processes requests for user (or callee) contact data from a requesting entity (e.g., caller system 105A). Each request includes the user's domain name, and can include additional contextual information, such as caller name, a caller telephone number, a caller domain name, and/or a custom message (including text, audio, and/or video data). A request may additionally indicate particular callee information that is being requested, such as the callee's personal telephone number, the callee's work telephone number, the callee's address on a particular communication platform, and the like. Request processing module 135 may determine that a caller is authorized to access the user contact data, and may accordingly request that data management module 130 retrieve the data, performing any decryption or other necessary access operations that may be needed. In some embodiments, a blockchain (e.g., blockchain 145) is accessed to retrieve the requested user contact data, whereas in other embodiments, some or all of the user data may be stored in one or more databases (e.g., database 140) and/or a decentralized storage platform.

Request processing module 135 can determine whether a requesting caller is authorized to access the callee's contact data based on approval by the callee. In some embodiments, request processing module 135 receives a request from a caller (e.g., via caller system 105A) and in response, transmits instructions to a callee device (e.g., callee system 105B) to alert the callee that a request to initiate a communication session has been received. The callee may then transmit an approval of the communication session to request processing module 135, which can initiate the communication session. In some embodiments, request processing module 135 interfaces with data management module 130 in order to retrieve contact data for the callee, and the contact data can be transmitted to caller system 105A. In some embodiments, request processing module 135 may host a communication session by using a callee's contact data to establish a communication session between callee system 105B and caller system 105A.

Additionally, request processing module 135 can determine whether a requesting caller is authorized to access the callee's contact data based on predetermined callee-defined permissions, which may indicate whether access to the callee's contact data is authorized based on one or more of the identity of the caller, the caller's domain name, a keyword in a message provided by the caller, and the like. Further, a callee's approval of a particular caller may be stored for a predetermined duration (e.g., an hour, a day, a week, indefinitely, etc.) so that the caller may be automatically authorized for a subsequent request to engage in a communication session.

Database 140 may include any non-volatile storage media known in the art. For example, database 140 can be implemented with a tape library, optical library, one or more independent hard disk drives, or multiple hard disk drives in a redundant array of independent disks (RAID). Similarly, data in database 140 may conform to any suitable storage architecture known in the art, such as a file, a relational database, an object-oriented database, and/or one or more tables. Database 140 may store data that includes user contact data (e.g., any data that can be used to initiate a communication session with a callee, such as a telephone number or other address, etc.), associations between domain names and user contact data, user-defined access permissions for the user's contact data, and the like.

Blockchain 145 is a distributed data ledger that is supported by a peer-to-peer network of computing devices. As such, blockchain 145 is a growing list of blocks that are cryptographically linked by providing a hash of the previous block, a time stamp, and transaction data. Blockchain 145 may be a public blockchain, a private blockchain, or a hybrid blockchain, and may support a variety of operations, including cryptocurrency exchange, smart contract execution, financial services, decentralized applications, and the like. Blockchain 145 can store any user data in accordance with present invention embodiments; in particular, user data may be associated with the user's domain name, and the underlying user data can be stored to blockchain 145 in an encrypted state. The particular computing devices that compose the peer-to-peer network of blockchain 145 may include computing devices of computing environment 100 (e.g., caller system 105A, callee system 105B, and/or server system 120) and/or may include other computing devices.

Network 150 may include a local area network (LAN), a wide area network (WAN) such as the Internet, or a combination of the two, and includes wired, wireless, or fiber optic connections. In general, network 150 can be any combination of connections and protocols known in the art that will support communications between caller system 105A, callee system 105B, server system 120, and/or components of blockchain 145 via their respective network interfaces in accordance with embodiments of the present invention. In some embodiments, network 150 comprises a telephony-based communication network, such as a Plain Old Telephone Service (POTS) network, a cellular network, and the like.

Figure 2:
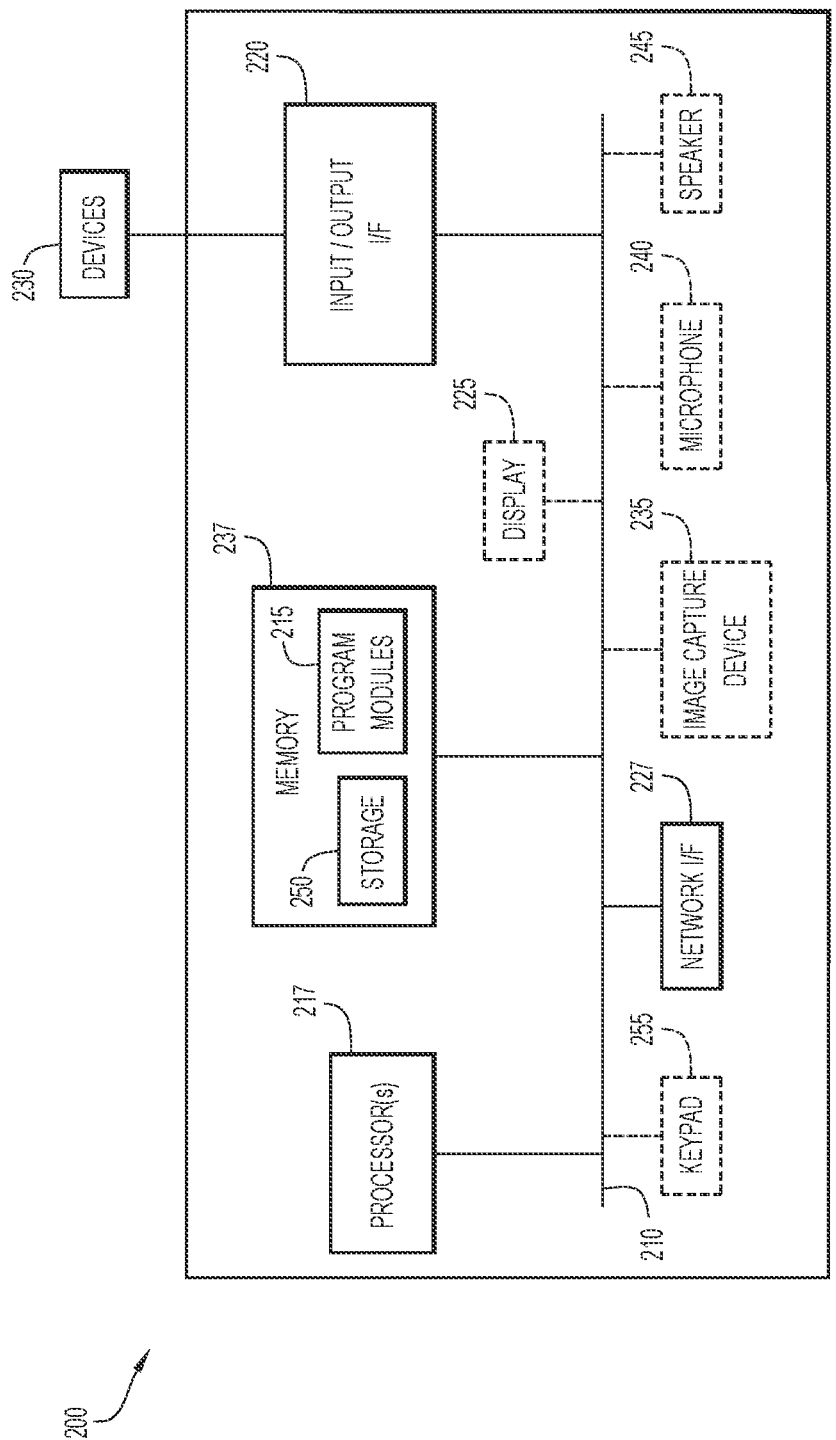
FIG. 2 is a block diagram of an example computing device according to an embodiment of the present invention.

An example of a computing device 200 of computing environment 100 (e.g., implementing caller system 105A, callee system 105B, server system 120 and/or any computing components that support blockchain 145) is illustrated in FIG. 2. The example computing device may perform the functions described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 217 (e.g., microprocessor, controller, central processing unit (CPU), etc.), network interface 227, memory 237, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 237 is coupled to bus 210 and typically includes computer readable media including volatile media (e.g., random access memory (RAM), cache memory, etc.), non-volatile media, removable media, and/or non-removable media. For example, memory 237 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 237 includes a set of program modules 215 (e.g., corresponding to client module 115, data management module 130, request processing module 135, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 227 coupled to bus 210.

With respect to certain entities (e.g., caller system 105A, callee system 105B, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

By way of example, present invention embodiments pertain to the use of domain names to secure user data, particularly blockchain domain names or non-fungible token (NFT) domain names. Initially, a blockchain is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alters the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a decentralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block). In addition, a blockchain may store software (e.g., typically referred to as smart contracts) that executes in response to occurrence of predefined conditions. A blockchain may be public (e.g., no access restrictions, etc.), private (e.g., restricted access, etc.), or hybrid (e.g., with centralized and de-centralized features).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFT), etc.). For example, a non-fungible token (NFT) is a crypto-type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., telephone number, name, address, email address, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts, user data, etc., for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that save user data to the blockchain, or alter saved user data and/or functionality for the blockchain domain name.

The domain name may include any quantity of terms, words, tokens, or arrangements of any quantity of any types of elements (e.g., alphanumeric or other characters, symbols, numbers, etc.). The domain name preferably includes a name portion and an optional extension that is associated with or indicates a hosting blockchain. By way of example, the domain name may be of the form "name.crypto" where "name" is the name portion and ".crypto" is the extension. The name portion and extension of the domain name may each include any quantity of terms, words, tokens, or arrangements of any quantity of any types of elements (e.g., alphanumeric or other characters, symbols, numbers, etc.).

Figure 3:
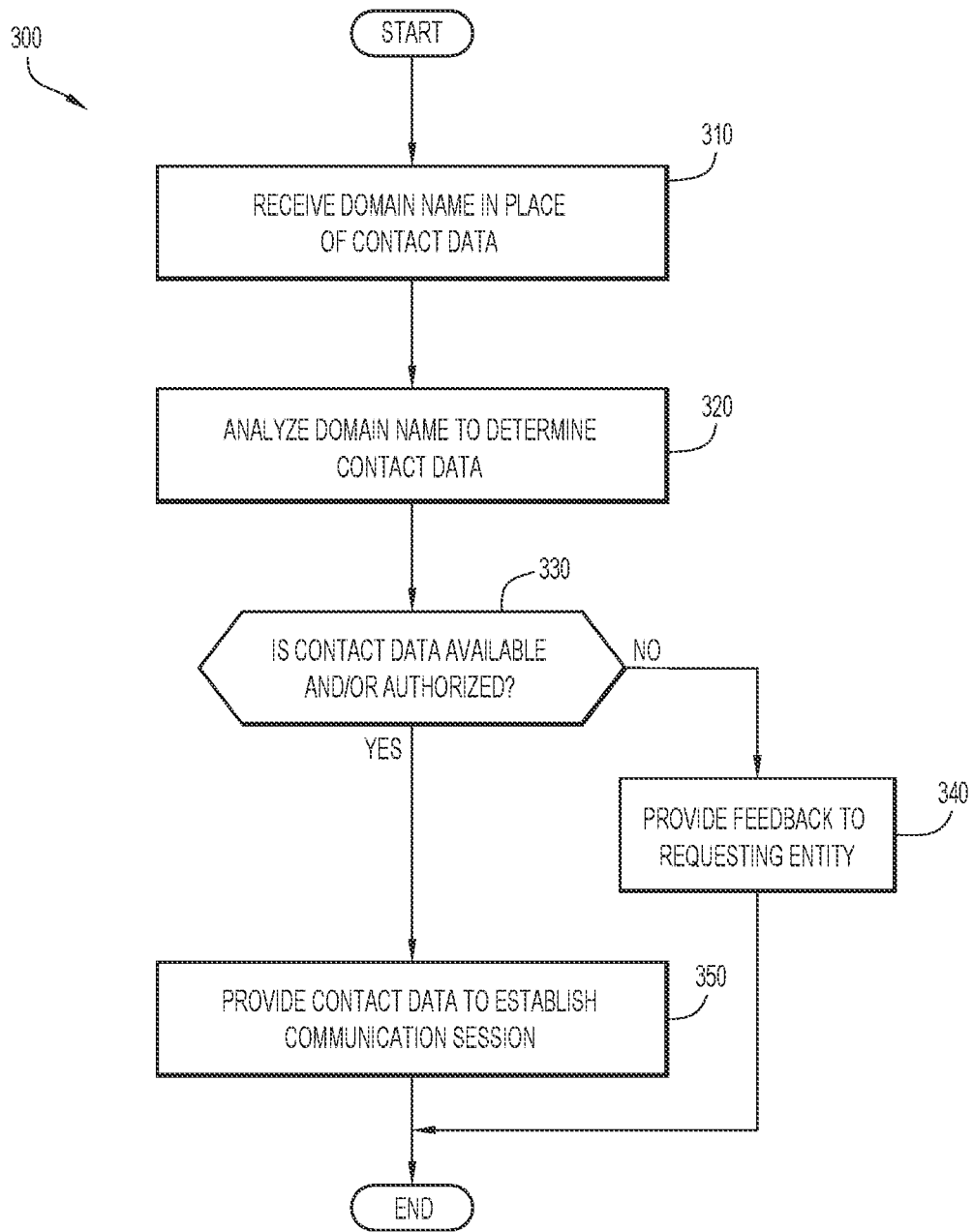
FIG. 3 is a flowchart of a method of securely providing user data to a requesting entity according to an embodiment of the present invention.

FIG. 3 is a flowchart of a method 300 of securely providing user data to a requesting entity according to an embodiment of the present invention.

A domain name is received in place of a callee's contact data (e.g., telephone number) at operation 310. Initially, a caller may provide a callee's domain name as input into a field of a communication session application, such as a telephony application or teleconferencing application. The application can identify that a domain name has been provided rather than conventional contact data (e.g., a telephone number) based on features of the domain name, such as the presence of a particular extension (e.g., ".crypto"). The domain name is passed by the application to a server (e.g., server system 120), which receives the domain name to perform further processing.

The domain name is analyzed to determine contact data (e.g., a telephone number) that is associated with the domain name at operation 320. The server (e.g., server system 120) may query a database using the domain name to identify a callee's contact data that is associated with the domain name. The contact data is stored using any storage mechanism or combination of storage mechanisms (e.g., off-chain database, decentralized storage platform, blockchain, etc.).

For example, the contact data may be stored on the blockchain containing the transaction to create the domain name (or NFT). In some embodiments, the contact data may be stored using a smart contract, which involves general-purpose computation that takes place on a blockchain. A smart contract can be deployed to a blockchain by sending a transaction that includes compiled code as well as a particular receiver address. The compiled code may execute when one or more conditions are met; in particular, the condition may include a request for contact data, and the compiled code may include instructions to provide the contact data to the receiver address when executed. The condition for execution can be satisfied by providing the smart contract with the domain name of the callee, and optionally, a particular field (e.g., name of caller, domain name of caller, etc. telephone number of caller, etc.). Thus, for example, a smart contract can store and provide user contact data. In this case, the contact data may be retrieved from the blockchain based on the domain name.

Alternatively, the contact data may be stored off-chain in a database or decentralized storage platform and associated or linked to the domain name. The contact data can be stored in a database using a conventional or other database management system. The contact data can be stored in a relational database on which queries can be executed to access specific items of contact data (e.g., a user's telephone number vs. a user's email address). For example, each item of contact data can be stored in a particular cell that is defined by a row value and column value. The contact data may be stored and accessed by associating the user's domain name with the data; for example, a particular table, cell, or range of cells may be indicated in the database by the user's domain name. A central server (e.g., server system 120) may pass requests for contact data to the database management system in order to retrieve the user data on behalf of the requesting entity (e.g., a caller).

Additionally or alternatively, contact data can be stored in a decentralized storage platform. Contact data may initially be provided to a server associated with the decentralized storage platform provider, whereupon the data is encrypted, divided into multiple pieces, and stored across multiple decentralized nodes. When the contact data is requested, the server associated with the decentralized storage platform provider can retrieve the encrypted pieces from the decentralized nodes, combine the pieces, and then decrypt the combined data to produce the requested contact data. A decentralized storage platform may provide a desired level of redundancy to avoid outages. In particular, the number of pieces needed to reconstitute the user data may be fewer than the number of pieces that are stored across the decentralized nodes. For example, the encrypted contact data may be split into 80 pieces and accordingly stored across 80 nodes; however, only 29 of those pieces may need to be retrieved in order to decrypt the user data. A central server (e.g., server system 120) may pass requests for contact data to the decentralized storage platform in order to retrieve the user data on behalf of the requesting entity (e.g., caller system 105A). The decentralized storage platform may associate user data of a particular user with the user's domain name, so that the user's domain name is used to request pieces of data from decentralized nodes.

The blockchain for the domain name (or NFT) may contain an indication of the storage structure (e.g., database, decentralized storage platform, etc.) containing the contact data, thereby enabling retrieval from the database or decentralized storage platform based on the domain name. In addition, the contact data may be retrieved directly from the storage structure (e.g., database, decentralized storage platform, etc.) based on the domain name.

The contact data in the blockchain, database, or decentralized storage platform may include, or be associated with, contextual information indicating the context for elements of the contact data (e.g., personal telephone number, work telephone number, username for a communication service, etc.). In addition, the contact data may be stored in the blockchain, database, or decentralized storage platform in an encrypted form using various techniques (e.g., any conventional or other encryption/compression techniques, cryptographic (or public/private) keys, etc.). For example, the contact data may be encrypted using a user private key of the blockchain and decrypted using the corresponding user public key, thereby limiting control of the decryption. Alternatively, the encryption may utilize public/private keys separate from the blockchain, or any conventional or other encryption/compression and decryption/decompression techniques.

Operation 330 determines whether the contact data (e.g., telephone number) is available and/or the whether the contact data is authorized to be shared with the caller. In the event that the contact data is unavailable or not authorized to be shared with the requesting entity (e.g., caller system 105A), feedback is provided to the requesting entity at operation 340. The feedback may include a denial of the request to initiate a communication session, and/or the feedback may indicate a particular explanation for why the contact data is unavailable or not permitted to be shared with the caller. For example, the feedback may indicate that a user has not yet associated a telephone number with the user's domain name, or the feedback may indicate that the user declined the request to establish a communication session.

Otherwise, if the contact data is available and usage of the contact data is authorized by the callee, the contact data is provided to establish a communication session at operation 350. The callee may authorize the usage of the contact data by digital signing a message using an endpoint device of the callee (e.g., callee system 105B). The digital signature can be provided based on a private key of the callee's wallet. In some embodiments, the contact data is provided to the device of the caller (e.g., caller system 105A), which can automatically or manually be used to call the callee. In some embodiments, the contact data is used by a server (e.g., server system 120) to establish a communication session between the caller and the callee.

Figure 4:
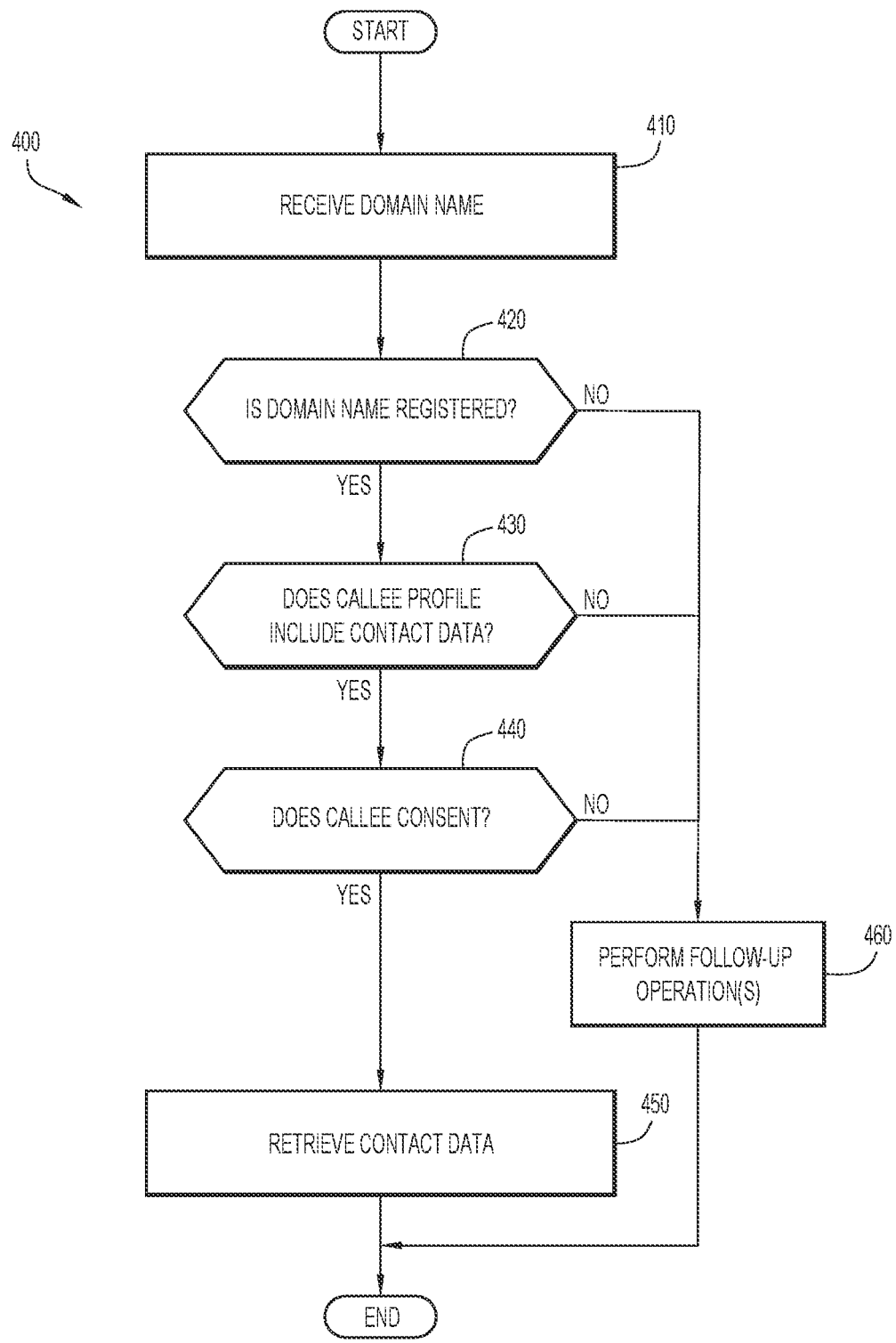
FIG. 4 is a flowchart of a method of retrieving user contact data according to an embodiment of the present invention.

FIG. 4 is a flowchart of a method 400 of retrieving user contact data based on a domain name according to an embodiment of the present invention. By way of example, method 400 may correspond to operations 310, 320, and 330 of FIG. 3.

A domain name is received at operation 410. The domain name may be received from a caller device (e.g., caller system 105A) in response to a caller inputting the domain name into the caller device and attempting to initiate a communication session. The domain name may be received by a server (e.g., server system 120), which may be configured to recognize the domain name as such, and accordingly utilizes the domain name to attempt to obtain contact data of the user associated with the domain name.

Operation 420 determines whether the domain name is registered with a user. The server (e.g., server system 120) may process the domain name by querying one or more storage locations to determine whether the domain name exists and is associated with a user. Domain names may be stored in any storage medium, such as a conventional database, a blockchain, a decentralized storage platform, and the like. If the domain name is not registered, then one or more follow-up operations may be performed at operation 460. In some embodiments, a follow-up operation may include transmitting a notification to the caller that the domain name is not registered with a user and may be incorrect.

If the domain name exists, then method 400 proceeds to determine whether the callee's user profile includes contact data at operation 430. A user profile may include any desired details about a user, such as biographical information, user accounts on various platforms, cryptocurrency wallet data, user preferences, and the like. Thus, at operation 430, the callee's profile is analyzed to determine whether the callee has provided contact data into a relevant contact field (e.g., telephone number, VoIP contact data, etc.). If the callee has not provided contact data to the callee's profile, then method 400 may proceed to operation 460 to perform one or more follow-up operations. In some embodiments, the caller may be informed that the callee has not provided contact data. Additionally or alternatively, the callee may be notified (e.g., via an automated email, via a push notification, etc.), thus giving the callee the opportunity to add the relevant contact data.

If the callee's profile includes the necessary contact data to initiate a communication session, then method 400 proceeds to determine whether the callee consents to the communication session at operation 440. A notification can be transmitted to an endpoint device of the callee (e.g., callee system 105B) that enables the callee to decide whether or not the callee consents to engage in the communication session. The callee may provide consent by digital signing a message using an endpoint device of the callee (e.g., callee system 105B). The digital signature can be provided based on a private key of the callee's wallet. Once the callee provides consent, then the contact data is retrieved at operation 450, and the communication session may be initiated. Consent to receive calls from a particular caller may be stored in order to automatically approve future requests to engage in a communication session by the same caller.

If the callee does not consent, then one or more follow-up operations may be performed at operation 460. In some embodiments, the request to engage in a communication session may be ignored or denied. In some embodiments, a notification may be transmitted to the caller to inform the caller that the request has been denied. In some embodiments, the request may time out, and the caller may be notified that the callee did not respond in time. In some embodiments, the callee may select a predetermined explanation as to why the request is being declined, or the callee may provide a custom message that is transmitted to the caller.

Figure 5:
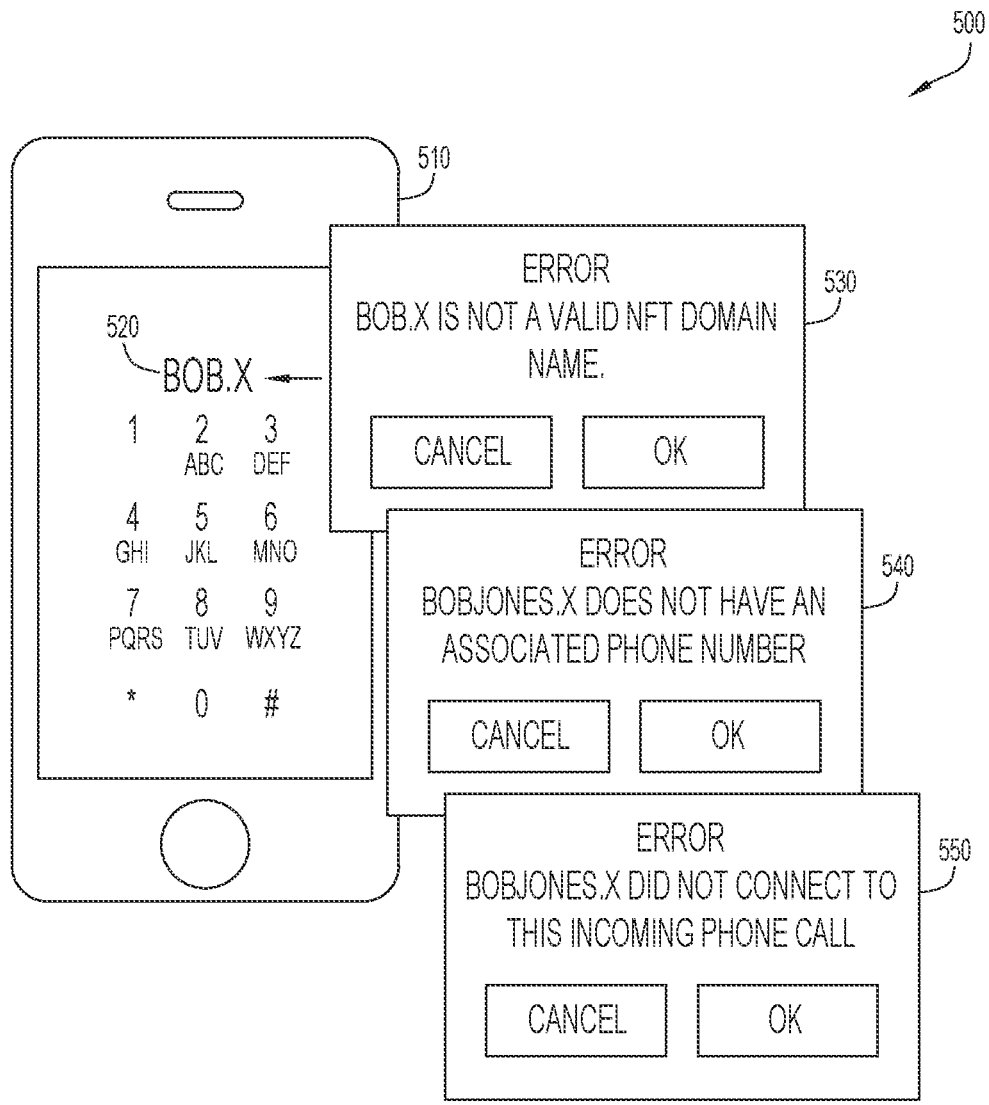
FIG. 5 is a schematic illustration of an example graphical user interface for using a domain name for a communication session according to an embodiment of the present invention.

FIG. 5 is a schematic illustration of example graphical user interfaces 520-550 for using a domain name for a communication session according to an embodiment of the present invention. As depicted, an endpoint device 510 includes a display that can present graphical user interfaces 520-550 to a user. Endpoint device 510 may include a smartphone or other device, and may correspond to caller system 105A, which is depicted and described with reference to FIG. 1. The notifications depicted in graphical user interfaces 530-550 may correspond to notifications associated with the one or more follow-up operations that are described with reference to FIG. 4 (e.g., operation 460).

As depicted in FIG. 5, user interface 520 includes an input field so that a user may provide a telephone number or a domain name, in accordance with present invention embodiments. Graphical user interfaces 530-550 may depict examples of feedback that is presented by the display of endpoint device 510. In the depicted example, graphical user interface 530 is presented in response to the user entering an invalid (e.g., unregistered) domain name. Graphical user interface 540 may be presented in response to a server (e.g., server system 120) determining that there is no telephone number associated with the domain name. Graphical user interface 550 may be presented in response to a callee failing to accept the request to initiate a communication session. Accordingly, a caller may be provided with feedback that explains why the requested communication session has not been established.

Figure 6:
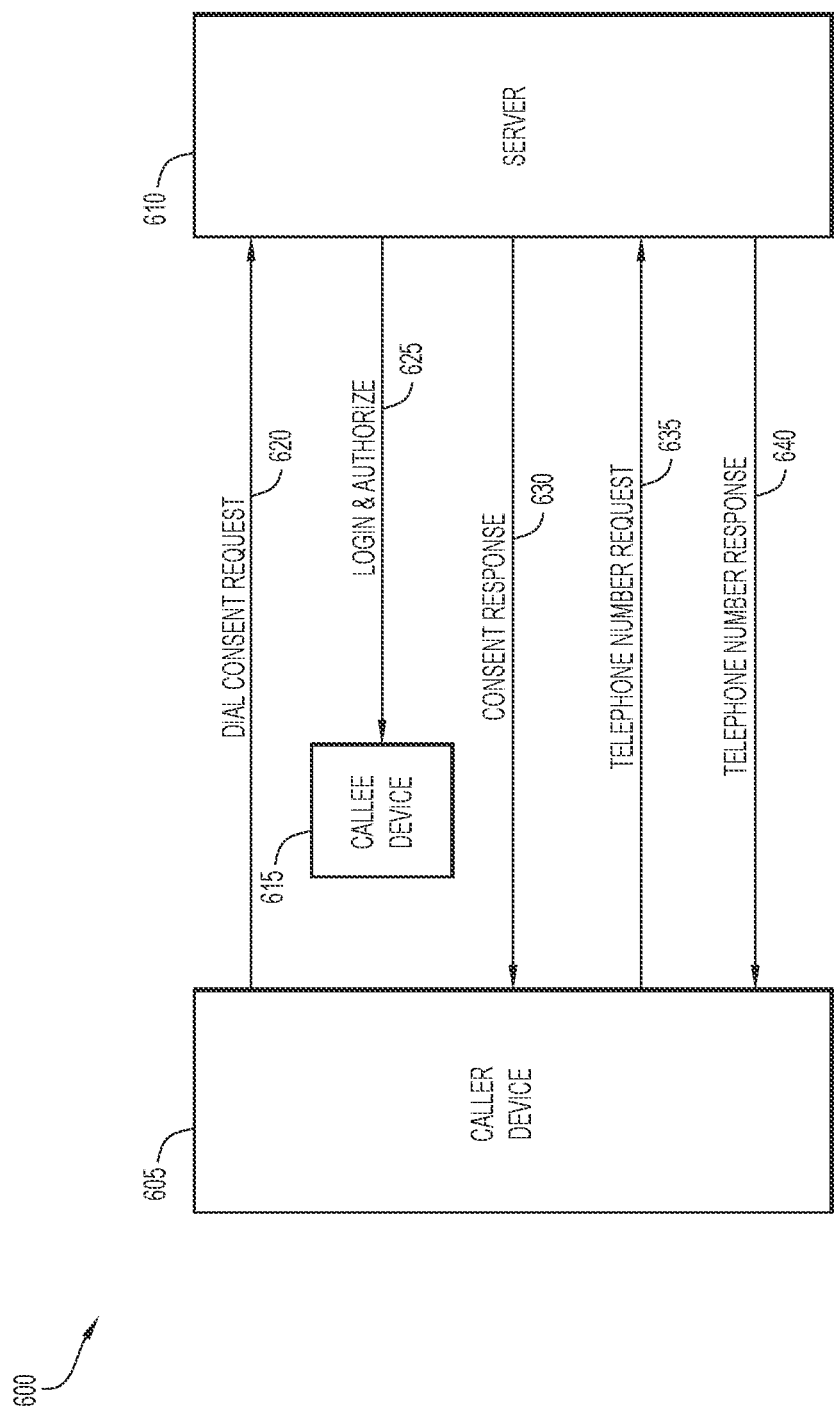
FIG. 6 is a flow diagram of an example of retrieving requested user data according to an embodiment of the present invention.

FIG. 6 is a flow diagram 600 of an example of retrieving requested user data according to an embodiment of the present invention. As depicted, data is exchanged between a caller device 605, server 610, and callee device 615, which may correspond to caller system 105A, server system 120, and callee system 105B, respectively, as depicted and described with reference to FIG. 1.

Initially, caller device 605 transmits a request to initiate a communication session at operation 620, which is received by server 610. The request may include a domain name that is associated with the person to whom the user of caller device 605 desires to speak. Server 610 may process the request by using the domain name to query one or more storage locations in order to identify a callee that is associated with the domain name. At operation 625, server 610 transmits a request to callee device 615 of the callee to provide his or her consent to access callee contact data for the communication session request. The callee may provide consent by digital signing a message using callee device 615. The digital signature can be provided based on a private key of the callee's wallet. Once the callee consents, server 610 can inform caller device 605 that the access for the communication session is approved at operation 630. Once approved, caller device 605 may transmit a request for the telephone number associated with the domain name at operation 635, and server 610 can reply with the telephone number at operation 640, thus enabling a telephone call to be placed by caller device 605 to callee device 615.

Figure 7:
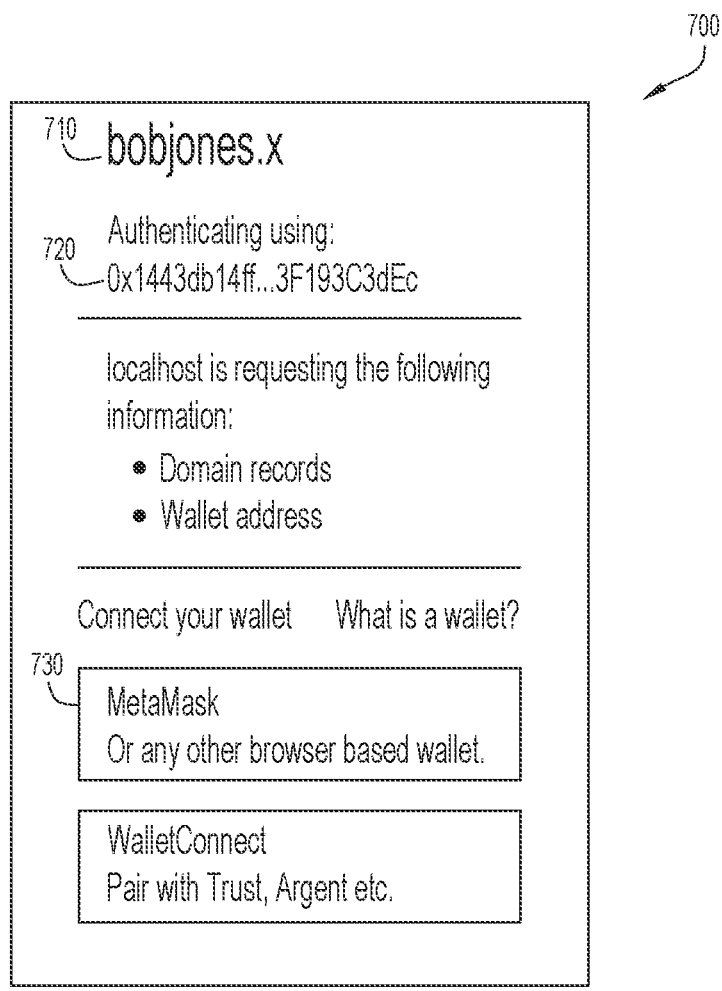
FIG. 7 is a schematic illustration of an example graphical user interface for managing a cryptocurrency wallet according to an embodiment of the present invention.

FIG. 7 is a schematic illustration of an example graphical user interface 700 for managing a cryptocurrency wallet according to an embodiment of the present invention. As depicted, graphical user interface 700 includes a user's (or callee) domain name 710, an authentication key 720, and one or more wallets 730. An authentication protocol may be employed to enable a user (or callee) to perform a wallet verification to prove ownership of the domain name by the user (or callee) (e.g., sign a message in a user wallet associated with the domain name, etc.). The authentication protocol may be a decentralized authentication protocol (e.g., the OpenID standard) or similar protocol.

As depicted, authentication key 720 may be a public key (e.g., wallet address) that is used to authenticate the user (or callee) with a selected wallet of wallets 730. Accordingly, a user may interact with graphical user interface 700 to access a wallet associated with the user's domain name. Once accessed, the user may sign a message in the wallet for user verification (e.g., the user owns the domain name).

By way of example, signing of the message in the selected wallet of the user (or callee) generates a digital signature of the message based on the private key of the wallet. The signed message or digital signature is decrypted for verification (e.g., by client module 115) based on the public key (e.g., blockchain address, etc.) corresponding to the selected wallet. Since the private key is unique to the selected wallet (or user), successful decryption of the message with the corresponding public key verifies the message was sent by the user. A response may be provided (e.g., from client module 115) indicating a result of the decryption of the signed message.

Figure 8:
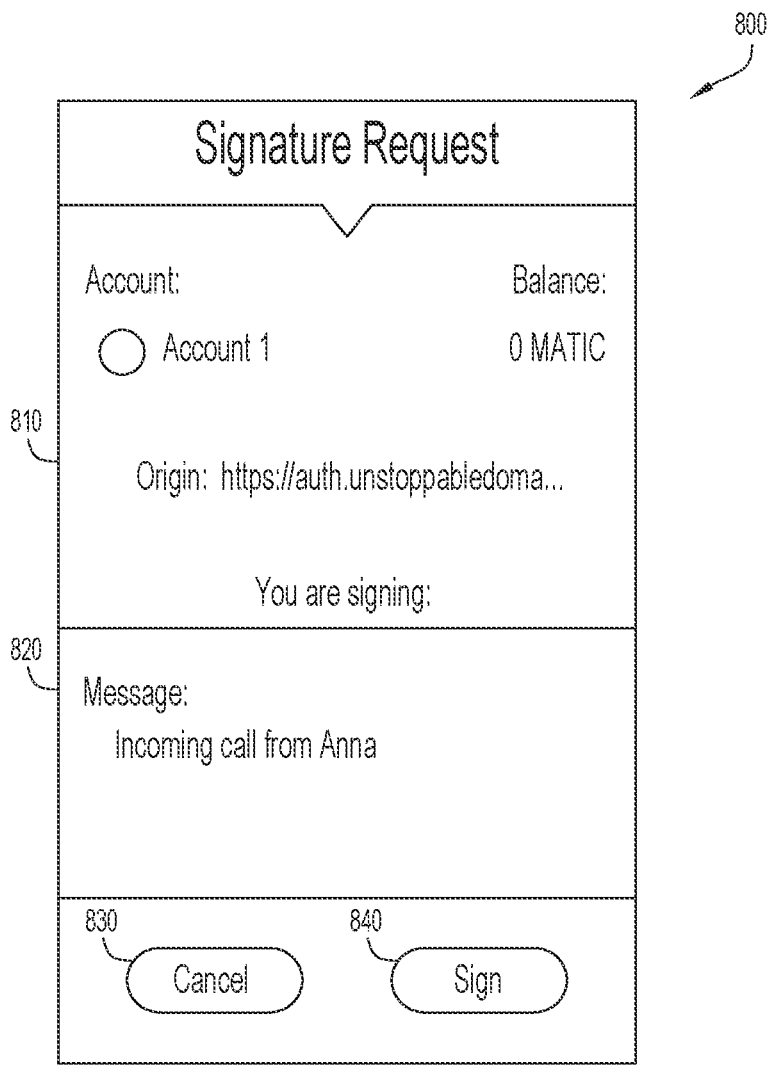
FIG. 8 is a schematic illustration of an example graphical user interface for authorizing a caller to engage in a communication session according to an embodiment of the present invention.

FIG. 8 is a schematic illustration of an example graphical user interface 800 for authorizing a callee to engage in a communication session according to an embodiment of the present invention. Graphical user interface 800 may include a request origin indicator 810, a message 820, a deny interface element 830, and an accept interface element 840. Graphical user interface 800 may be presented to a callee in response to a caller requesting to have a communication session.

Request origin indicator 810 may include details relating to the service providing the authentication request, such as a link or Uniform Resource Locator (URL) of the service, or any other identifier. Message 820 may include a predetermined or custom message that the caller can provide to describe a context of the request, such as additional details about the caller, a reason for the request, and the like. In some embodiments, message 820 may include audio and/or video content, such as a recording of the caller's voice, a photograph of the caller, etc.

Deny interface element 830 and accept interface element 840 enable a callee to deny or accept a request, respectively. Actuating deny interface element 830 may cause a message to be transmitted to the caller's device that indicates that the request was denied. Actuating accept interface element 840 may perform one or more actions, including signing the message for user verification which enables establishing a communication session, and/or approving a caller for subsequent communication sessions.

It will be appreciated that the embodiments described above and illustrated in the drawings represent only a few of the many ways of implementing embodiments for securely controlling communication sessions using user domain names. In addition, characteristics or features of embodiments of the present invention may be combined in any fashion to provide additional embodiments of the present invention.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including client module 115, data management module 130, request processing module 135, etc.), etc.). These systems may include any types of monitors and input devices (e.g., keyboard, mouse, voice recognition, etc.) to enter and/or view information.

It is to be understood that the software of the present invention embodiments (e.g., client module 115, data management module 130, request processing module 135, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., client module 115, data management module 130, request processing module 135, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user contact data, domain names, associations between particular data items (e.g., domain names and contact data), request permission data, etc.). The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., user contact data, domain names, associations between particular data items (e.g., domain names and contact data), request permission data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for establishing any exchange of data or communication session (e.g., telephone call, video call, teleconference, audio conference, email, chat, etc.) based on a domain name.

The various names and data items (e.g., domain names, user contact data, etc.) may have any form or format, and may include any quantity of terms, words, tokens, or arrangements of any quantity of elements (e.g., alphanumeric or other characters, symbols, numbers, etc.). The domain names may include any domain name format, including subdomains, or may be formatted according to another schema, such as a single word, a phrase, an alphanumeric value, a value that includes extended characters, and the like.

The domain name may be registered on any quantity of any types of domain name registries for any types of systems (e.g., centralized, de-centralized, hybrid, etc.). The registration may be stored on the domain name registry in any fashion (e.g., one or more records of a registry, a non-fungible or other token of a wallet (based on the registration being on a blockchain), etc.).

The user contact data that is retrieved using a domain name can include any data, including telephone number data, communication platform account data, VoIP telephone number data, email, handle, and the like. The user contact data can be encrypted/decrypted according to any conventional or other encryption/decryption algorithm, and may be compressed/decompressed prior to encryption/decryption. The access permissions for user contact data can include any criteria, including callee approval criteria, requesting entity identity criteria, time-based criteria, location-based criteria, use-case criteria, data type criteria, or other criteria.

A blockchain network that is used to store user contact data can include any distributed ledger, including a Bitcoin blockchain, an Ethereum blockchain, a Cardano blockchain, or other blockchain network, including private, public, and hybrid networks. The blockchain network may utilize any protocol or combination of protocols, and consensus for stored data may be achieved using any conventional or other consensus mechanism. Data stored to the blockchain may be mirrored in one or more conventional databases at the time of storage or periodically to provide a cached data store that can be accessed more quickly.

Having described preferred embodiments of a new and improved system, method, and computer program product for securely controlling communication sessions using user domain names, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of conducting communication sessions comprising:
    receiving, via at least one processor, a domain name that is provided by a first user in a telephone number field of a user interface to establish a communication session with a second user, wherein the domain name is associated with the second user;
    determining, via the at least one processor, contact information of the second user for the communication session based on the domain name; and
    providing, via the at least one processor, the contact information of the second user to establish the communication session between communication devices of the first and second users, wherein the contact information includes a telephone number, and wherein the communication session includes a telephone call.

2. The method of claim 1, wherein the domain name is one of a blockchain domain name and a non-fungible token domain name.

3. The method of claim 1, wherein an association between the contact information and the domain name is stored on one or more of: a blockchain, and a database.

4. The method of claim 1, wherein providing the contact information comprises verifying ownership of the domain name by the second user based on a wallet verification.

5. The method of claim 1, wherein providing the contact information comprises obtaining an approval to provide the contact information based on signing a message in a wallet of the second user.

6. The method of claim 5, wherein the approval is utilized for a subsequent communication session between the first and second users, and wherein the approval is stored in one or more of: a blockchain, and a database.

7. A system for conducting communication sessions comprising:
    one or more memories; and
    at least one processor coupled to the one or more memories, the at least one processor configured to:
    receive a domain name that is provided by a first user in a telephone number field of a user interface to establish a communication session with a second user, wherein the domain name is associated with the second user;
    determine contact information of the second user for the communication session based on the domain name; and
    provide the contact information of the second user to establish the communication session between communication devices of the first and second users, wherein the contact information includes a telephone number, and wherein the communication session includes a telephone call.

8. The system of claim 7, wherein the domain name is one of a blockchain domain name and a non-fungible token domain name.

9. The system of claim 7, wherein an association between the contact information and the domain name is stored on one or more of: a blockchain, and a database.

10. The system of claim 7, wherein providing the contact information comprises verifying ownership of the domain name by the second user based on a wallet verification.

11. The system of claim 7, wherein providing the contact information comprises obtaining an approval to provide the contact information based on signing a message in a wallet of the second user.

12. The system of claim 11, wherein the approval is utilized for a subsequent communication session between the first and second users, and wherein the approval is stored in one or more of: a blockchain, and a database.

13. A computer program product for conducting communication sessions, the computer program product comprising one or more non-transitory computer readable media having instructions stored thereon, the instructions executable by at least one processor to cause the at least one processor to:
    receive a domain name that is provided by a first user in a telephone number field of a user interface to establish a communication session with a second user, wherein the domain name is associated with the second user;
    determine contact information of the second user for the communication session based on the domain name; and
    provide the contact information of the second user to establish the communication session between communication devices of the first and second users, wherein the contact information includes a telephone number, and wherein the communication session includes a telephone call.

14. The computer program product of claim 13, wherein the domain name is one of a blockchain domain name and a non-fungible token domain name.

15. The computer program product of claim 13, wherein an association between the contact information and the domain name is stored on one or more of: a blockchain, and a database.

16. The computer program product of claim 13, wherein providing the contact information comprises verifying ownership of the domain name by the second user based on a wallet verification.

17. The computer program product of claim 13, wherein providing the contact information comprises obtaining an approval to provide the contact information based on signing a message in a wallet of the second user.

18. The computer program product of claim 17, wherein the approval is utilized for a subsequent communication session between the first and second users, and wherein the approval is stored in one or more of: a blockchain, and a database.

* * * * *